United States Patent
Steinbach et al.

(10) Patent No.: US 8,637,193 B2
(45) Date of Patent: Jan. 28, 2014

(54) FUEL CELL NANOCATALYST WITH VOLTAGE REVERSAL TOLERANCE

(75) Inventors: Andrew J. L. Steinbach, Minneapolis, MN (US); George D. Vernstrom, Cottage Grove, MN (US); Mark K. Debe, Stillwater, MN (US); Radoslav Atanasoski, Edina, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 387 days.

(21) Appl. No.: 12/546,775

(22) Filed: Aug. 25, 2009

(65) Prior Publication Data
US 2010/0047668 A1 Feb. 25, 2010

Related U.S. Application Data

(60) Provisional application No. 61/091,643, filed on Aug. 25, 2008.

(51) Int. Cl.
| | |
|---|---|
| H01M 8/00 | (2006.01) |
| H01M 4/02 | (2006.01) |
| H01M 4/36 | (2006.01) |
| H01M 4/62 | (2006.01) |
| H01M 4/92 | (2006.01) |
| B01J 23/00 | (2006.01) |
| B01J 21/00 | (2006.01) |

(52) U.S. Cl.
USPC ........... 429/400; 429/524; 429/532; 502/261; 502/326; 502/327; 502/332; 502/439

(58) Field of Classification Search
USPC ........... 502/261, 326, 327, 332, 439, 527.14, 502/527.15; 429/400, 524, 532
See application file for complete search history.

(56) References Cited

U.S. PATENT DOCUMENTS 3,287,172 A * 11/1966 Shropshire et al. ........... 502/101
3,288,653 A * 11/1966 Holt et al. ..................... 429/524

(Continued)

FOREIGN PATENT DOCUMENTS

| EP | 1 653 535 A | 5/2006 |
| EP | 1 868 258 A | 12/2007 |

(Continued)

OTHER PUBLICATIONS

Chow, G. M., Stockton, W. B., Price, R., Baral, S., Ting, A.C., Ratna, B. R., Shoen, P.E., and Schnur, J. M.; "Fabrication of Biologically Based Microstructure Composites for Vacuum Field Emission", Materials Science and Engineering, A158 (1992), pp. 1-6.

(Continued)

*Primary Examiner* — Cam N. Nguyen
(74) *Attorney, Agent, or Firm* — Gregory D. Allen

(57) ABSTRACT

In some embodiments, the present disclosure provides a fuel cell catalyst having a catalyst surface bearing a non-occluding layer of iridium. In some embodiments, the present disclosure provides a fuel cell catalyst comprising a catalyst surface bearing a sub-monolayer of iridium. In some embodiments, the present disclosure provides a fuel cell catalyst comprising a catalyst surface bearing a layer of iridium having a planar equivalent thickness of between 1 and 100 Angstroms. In some embodiments, the fuel cell catalyst comprises nanostructured elements comprising microstructured support whiskers bearing a thin film of nanoscopic catalyst particles. The layer of iridium typically has a planar equivalent thickness of between 1 and 100 Angstroms and more typically between 5 and 60 Angstroms. The fuel cell catalyst typically comprises no electrically conductive carbon material and typically comprises at least a portion of the iridium in the zero oxidation state.

10 Claims, 5 Drawing Sheets

A - 0.40Pt/C
B - 0.20Pt/C
C - 0.10mg/cm2 modified NSTF
  2 MEAs plotted
D - 80/80/80C, 0/0psig, 1000/1000SCCM.
  1%H2 in N2 reference/counter, N2 working
  2mA/cm2 oxidation current

(56) References Cited

U.S. PATENT DOCUMENTS

| | | | |
|---|---|---|---|
| 3,296,025 A * | 1/1967 | Holt et al. | 502/4 |
| 3,351,494 A * | 11/1967 | Batzold | 252/182.1 |
| 3,840,407 A * | 10/1974 | Yao et al. | 429/400 |
| 3,992,271 A * | 11/1976 | Danzig et al. | 205/631 |
| 4,340,276 A | 7/1982 | Maffitt et al. | |
| 4,457,986 A * | 7/1984 | Bindra et al. | 429/499 |
| 4,568,598 A | 2/1986 | Bilkadi et al. | |
| 4,812,352 A | 3/1989 | Debe | |
| 5,039,561 A | 8/1991 | Debe | |
| 5,176,786 A | 1/1993 | Debe | |
| 5,336,558 A | 8/1994 | Debe | |
| 5,338,430 A | 8/1994 | Parsonage et al. | |
| 5,879,827 A | 3/1999 | Debe et al. | |
| 5,879,828 A | 3/1999 | Debe et al. | |
| 6,297,185 B1 * | 10/2001 | Thompson et al. | 502/101 |
| 6,319,293 B1 | 11/2001 | Debe et al. | |
| 6,482,763 B2 | 11/2002 | Haugen et al. | |
| 6,624,328 B1 | 9/2003 | Guerra | |
| 6,660,680 B1 * | 12/2003 | Hampden-Smith et al. | 502/180 |
| 6,686,308 B2 * | 2/2004 | Mao et al. | 502/180 |
| 6,946,362 B2 | 9/2005 | Gore et al. | |
| 7,141,528 B2 * | 11/2006 | Hampden-Smith et al. | 502/180 |
| 7,205,255 B2 * | 4/2007 | Yamamoto | 502/101 |
| 7,348,088 B2 | 3/2008 | Hamrock et al. | |
| 7,419,741 B2 | 9/2008 | Vernstrom et al. | |
| 7,569,509 B2 * | 8/2009 | Oonuma | 502/185 |
| 7,572,534 B2 | 8/2009 | Frey et al. | |
| 7,622,217 B2 | 11/2009 | Debe et al. | |
| 7,691,780 B2 * | 4/2010 | Adzic et al. | 502/339 |
| 7,704,918 B2 * | 4/2010 | Adzic et al. | 502/327 |
| 7,704,919 B2 * | 4/2010 | Adzic et al. | 502/344 |
| 7,816,041 B2 * | 10/2010 | Osaka et al. | 429/400 |
| 7,842,430 B2 * | 11/2010 | Choi et al. | 429/482 |
| 7,855,021 B2 * | 12/2010 | Adzic et al. | 429/424 |
| 7,867,648 B2 * | 1/2011 | Atanasoski et al. | 429/137 |
| 7,875,569 B2 * | 1/2011 | Roev et al. | 502/180 |
| 7,976,989 B2 * | 7/2011 | Lopez et al. | 429/400 |
| 8,040,077 B2 | 10/2011 | Debe et al. | |
| 8,062,552 B2 * | 11/2011 | Adzic et al. | 252/500 |
| 2002/0004453 A1 | 1/2002 | Haugen et al. | |
| 2006/0063054 A1 | 3/2006 | Frey et al. | |
| 2006/0093892 A1 | 5/2006 | Min et al. | |
| 2006/0135359 A1 | 6/2006 | Adzic et al. | |
| 2007/0082814 A1 | 4/2007 | Debe et al. | |

FOREIGN PATENT DOCUMENTS

| | | |
|---|---|---|
| WO | 2003/018469 | 3/2003 |
| WO | WO 2007/119130 A | 10/2007 |
| WO | 2008/025751 | 3/2008 |

OTHER PUBLICATIONS

Debe et al., "Activities of Low Pt Loading, Carbon-less, Ultra-Thin nanostructured Film-Based Electrodes for PEM Fuel Cells and Roll-Good Fabricated MEA Performances in Single Cells and Stacks," 2003 Fuel Cell Seminar Abstract Book, pp. 812-85 (2003 FC Abstract).

Debe, M. K., Kam, K. K., Liu, J. C., and Poirier, R. J.; "Vacuum Vapor Deposited Thin Films of a Perylene Dicarboximide Derivative: Microstructure Versus Deposition Parameters", J. Vac. Sci. Technol. A, 6, (3), May/Jun. 1988, pp. 1907-1911.

Debe, M. K. and Poirier, R. J.; "Effect of Gravity on Copper Phthalocyanine Thin Films III: Microstructure Comparisons of Copper Phthalocyanine Thin Films Grown in Microgravity and Unit Gravity", Thin Solid Films, 186, 1990, pp. 327-347.

Dokoutchaev, A. G., Abdelrazzaq, F., and Thompson, M. E. "Multicomponent Electrodes For Water Oxidation: From Combinatorial To Individual Electrode Study," Alexandre G. Dokoutchaev, Feraz Abdelrazzaq, and Mark E. Thompson, Chem. Mater. 2002, 14, pp. 334-3348.

Grigoriev, S. A., Millet, P. and Fateev, V. N.; "Evaluation of Carbon-Supported Pt and Pd Nanoparticles For The Hydrogen Evolution Reaction In PEM Water Electrolysers", Journal of Power Sources, 177, (2008), pp. 282-285.

Ioroi, T. and Yasuda, K. "Platinum-Iridium Alloys As Oxygen Reduction Electrocatalysts For Polymer Electrolyte Fuel Cells," Tsutomu Ioroi and Kazuaki Yasuda, Journal of Electrochemical Soc. 152 (10) pp. A1917-A1924 (2005).

Kam, K. K. Debe, M. K., Poirier, R. J., and Drube, A. R.; "Summary Abstract: Dramatic Variation of the Physical Microstructure of a Vapor Deposited Organic Thin Film", J. Vac. Sci. Technol. A, 5 (4), Jul./Aug. 1987, pp. 1914-1916.

Lee, P. K. amd Debe, M. K.; "Measurement and Modeling of the Reflectance-Reducing Properties of Gradient Index Microstructured Surfaces"; Photographic Science and Engineering, 24, (4), Jul./Aug. 1980, pp. 211-216.

Marshall, A.T., Sunde, S., Tsypkin, M., and Tunold, R.; "Performance of a PEM Water Electrolysis Cell Using $Ir_xRu_yTa_zO_2$ Electrocatalysts For The Oxygen Evolution Electrode," International Journal of Hydrogen Energy, vol. 32, Issue 13, Sep. 2007, pp. 230-2324.

Marshall, A, Borresen, B., Hagen, G., Tsypkin, M., and Tunold, R.; "Electrochemical Characterization Of $Ir_xSn_{1-x}O_2$ Powders As Oxygen Evolution Electro Catalysts," Electrochimica Acta, vol. 51, Issue 15, Apr. 2006, pp. 3161-3167.

Ohnume, S., Nakanouchi, Y., and Masumoto, T.; Amorphous Ultrafine Metallic Particles Prepared by Sputtering Method:, Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishes B.V., New York, (1985), pp. 1117-1124.

Sadaoka, Y, Jones, T. A., Revell, G. S., and Gopel, W.; "Effects of Morphology on $NO_2$ Detection in Air at Room Temperature with Phthalocyanine Thin Films", Journal Of Materials Science, 25, 1990, pp. 5257-5268.

Slavcheva, E., Radev, I, Bliznakov, S., Topalov, G., Andreev, P., and Budevski, E.; "Sputtered Iridium Oxide Films As Electrocatalysts For Water Splitting Via PEM Electrolysis," E. Slavcheva, I Radev, S. Bliznakov, G. Topalov, P. Andreev and E. Budevski, Electrochimica Acta 52 (2007) pp. 3389-3894.

Tang, H., Chen, J. H., Huang, Z. P., Wang, D. Z., Ren, Z. F., Nie, L. H., Kuang, Y. F. and Yao, S. Z.; "High Dispersion and Electrocatalytic Properties of Platinum on Well-Aligned Carbon Nanotube Arrays," Carbon 42 (2004), pp. 191-197.

Wessling, B, Besmehn, A., Mokwa, W., and Schnakenberg, U.; "Reactively Sputtered Iridium Oxide—Influence of Plasma Excitation and Substrate Temperature on Morphology, Composition and Electrochemical Characteristics," Borge Wessling, Astrid Besmehn, Wilfried Mokwa, and Uwe Schnakenberg, Journal of Electrochemical Soc. 154 (5) (2007), pp. F83-F89.

\* cited by examiner

A - 0.40Pt/C

B - 0.20Pt/C

C - 0.10mg/cm$_2$ modified NSTF
2 MEAs plotted

D - 80/80/80C, 0/0psig, 1000/1000SCCM.
1%H$_2$ in N$_2$ reference/counter, N$_2$ working
2mA/cm$^2$ oxidation current

FUEL CELL NANOCATALYST WITH VOLTAGE REVERSAL TOLERANCE

CROSS REFERENCE TO RELATED APPLICATION

This application claims the benefit of U.S. Provisional Patent Application No. 61/091,643, filed Aug. 25, 2008, the disclosure of which is incorporated by reference herein in its entirety.

This invention was made with Government support under Cooperative Agreement DE-FG36-07GO17007 awarded by DOE. The Government has certain rights in this invention.

FIELD OF THE DISCLOSURE

This disclosure relates to nanostructured thin film (NSTF) catalysts comprising iridium which may be useful as fuel cell catalysts, in particular as fuel cell anode catalysts.

BACKGROUND OF THE DISCLOSURE

U.S. Pat. No. 5,879,827, the disclosure of which is incorporated herein by reference, discloses nanostructured elements comprising acicular microstructured support whiskers bearing acicular nanoscopic catalyst particles. The catalyst particles may comprise alternating layers of different catalyst materials which may differ in composition, in degree of alloying or in degree of crystallinity.

U.S. Pat. No. 6,482,763, the disclosure of which is incorporated herein by reference, discloses fuel cell electrode catalysts comprising alternating platinum-containing layers and layers containing suboxides of a second metal that display an early onset of CO oxidation.

U.S. Pat. Nos. 5,338,430, 5,879,828, 6,040,077 and 6,319,293, the disclosures of which are incorporated herein by reference, also concern nanostructured thin film catalysts.

U.S. Pat. Nos. 4,812,352, 5,039,561, 5,176,786, and 5,336,558, the disclosures of which are incorporated herein by reference, concern microstructures.

U.S. patent application Ser. No. 10/674,594, issuing Sep. 2, 2008, as U.S. Pat. No. 7,419,741, the disclosure of which is incorporated herein by reference, discloses fuel cell cathode catalysts comprising nanostructures formed by depositing alternating layers of platinum and a second layer onto a microstructure support, which may form a ternary catalyst.

U.S. patent application Ser. No. 11/248,561, the disclosure of which is incorporated herein by reference, discloses fuel cell cathode catalysts comprising microstructured support whiskers bearing nanoscopic catalyst particles comprising platinum and manganese and at least one other metal at specified volume ratios and Mn content, where other metal is typically Ni or Co.

U.S. patent application Ser. Nos. 10/945,178 and 10/944,998, the disclosures of which are incorporated herein by reference, discloses fuel cell membrane electrode assemblies and fuel cell polymer electrolyte membranes comprising bound anionic functional groups and Mn or Ru cations or comprising manganese oxides which demonstrate increased durability.

Some investigators report the use of iridium containing catalysts for oxygen evolution. The following reference may be relevant to such a technology: "Performance of a PEM water electrolysis cell using $Ir_xRu_yTa_zO_2$ electrocatalysts for the oxygen evolution electrode," International Journal of Hydrogen Energy, volume 32, Issue 13, September 2007, pp 2320-2324. "Electrochemical characterization of $Ir_xSn_{1-x}O_2$ powders as oxygen evolution electro catalysts," Electrochimica Acta, Volume 51, Issue 15, April 2006, pp 3161-3167.

Some investigators report the use of sputtered iridium oxide in certain electrocatalysts. The following references may be relevant to such a technology: "Sputtered iridium oxide films as electrocatalysts for water splitting via PEM electrolysis," E. Slavcheva, I Radev, S. Bliznakov, G. Topalov, P. Andreev and E. Budevski, Electrochimica Acta 52 (2007) pp 3389-3894. "Multicomponent Electrodes for Water Oxidation: From Combinatorial to Individual Electrode Study," Alexandre G. Dokoutchaev, Feraz Abdelrazzaq, and Mark E. Thompson, Chem. Mater. 2002, 14, 3343-3348. "Platinum-Iridium Alloys as Oxygen Reduction Electrocatalysts for Polymer Electrolyte Fuel Cells," Tsutomu Ioroi and Kazuaki Yasuda, Journal of Electrochemical Soc. 152 (10) A1917-A1924 (2005). "Reactively Sputtered Iridium Oxide—Influence of plasma excitation and substrate temperature on morphology, composition and electrochemical characteristics," Borge Wessling, Astrid Besmehn, Wilfried Mokwa, and Uwe Schnakenberg, Journal of Electrochemical Soc. 154 (5) F83-F89 (2007).

Some investigators report the use of iridium black in a fuel cell anode. The following reference may be relevant to such a technology: S. A. Grigoriev, P. Millet, V. N. Fateev, Journal of Power Sources 177 (2008), 282-285.

SUMMARY OF THE DISCLOSURE

Briefly, the present disclosure provides a fuel cell catalyst comprising a catalyst surface bearing a non-occluding layer of iridium. In some embodiments, the present disclosure provides a fuel cell catalyst comprising a catalyst surface bearing a sub-monolayer of iridium. In some embodiments, the present disclosure provides a fuel cell catalyst comprising a catalyst surface bearing a layer of iridium having a planar equivalent thickness of between 1 and 100 Angstroms. In some embodiments, the fuel cell catalyst comprises nanostructured elements comprising microstructured support whiskers bearing a thin film of nanoscopic catalyst particles. The layer of iridium typically has a planar equivalent thickness of between 1 and 100 Angstroms and more typically between 5 and 60 Angstroms. The fuel cell catalyst typically comprises no electrically conductive carbon material and typically comprises at least a portion of the iridium in the zero oxidation state.

The catalyst may be the anode of a fuel cell membrane electrode assembly.

In this application:

"membrane electrode assembly" means a structure comprising a membrane that includes an electrolyte, typically a polymer electrolyte, and at least one but more typically two or more electrodes adjoining the membrane;

"nanostructured element" means an acicular, discrete, microscopic structure comprising a catalytic material on at least a portion of its surface;

"nanoscopic catalyst particle" means a particle of catalyst material having at least one dimension equal to or smaller than about 15 nm or having a crystallite size of about 15 nm or less, as measured from diffraction peak half widths of standard 2-theta x-ray diffraction scans;

"thin film of nanoscopic catalyst particles" includes films of discrete nanoscopic catalyst particles, films of fused nanoscopic catalyst particles, and films of nanoscopic catalyst grains which are crystalline or amorphous; typically films of discrete or fused nanoscopic catalyst particles, and most typically films of discrete nanoscopic catalyst particles;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer;

"planar equivalent thickness" means, in regard to a layer distributed on a surface, which may be distributed unevenly, and which surface may be an uneven surface (such as a layer of snow distributed across a landscape, or a layer of atoms distributed in a process of vacuum deposition), a thickness calculated on the assumption that the total mass of the layer was spread evenly over a plane covering the same area as the projected area of the surface (noting that the projected area covered by the surface is less than or equal to the total surface area of the surface, once uneven features and convolutions are ignored);

"bilayer planar equivalent thickness" means the total planar equivalent thickness of a first layer (as described herein) and the next occurring second layer (as described herein);

"non-occluding layer" means a deposit of a material on a surface that does not occlude all of the that surface;

"sub-monolayer" means a deposit of a material on a surface in an amount insufficient to cover that surface with a monolayer of atoms of that material; and the symbol "Å" represents Angstroms, notwithstanding any typographical or computer error.

It is an advantage of the present disclosure to provide cathode catalysts for use in fuel cells.

DETAILED DESCRIPTION

Figure 1:
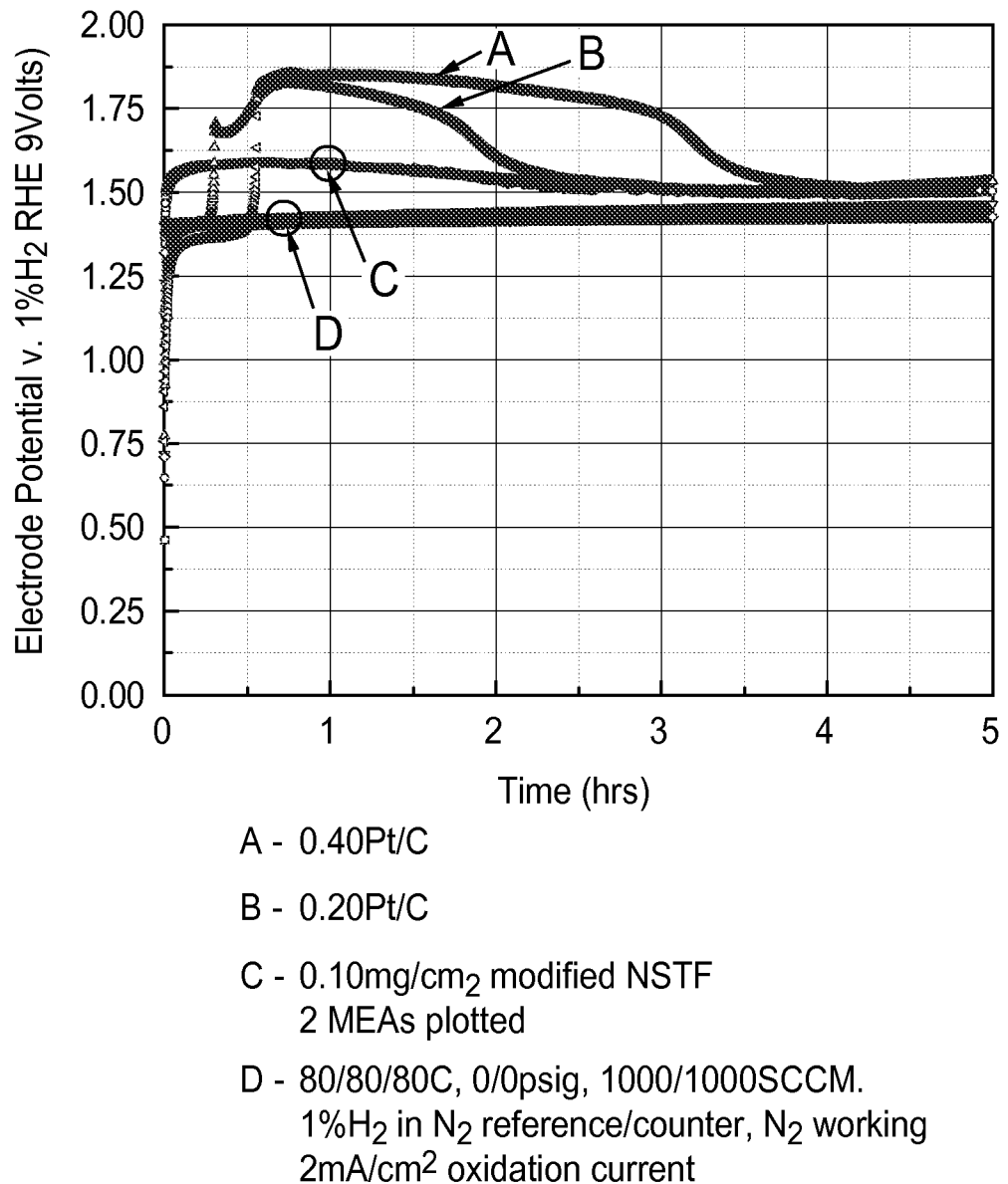
FIG. 1 is a graph of potential vs. time for comparative and subject MEA's for the durability test procedure described in Example I.

The present disclosure provides a fuel cell catalyst comprising a catalyst surface bearing a non-occluding layer of iridium. In some embodiments, the present disclosure provides a fuel cell catalyst comprising a catalyst surface bearing a sub-monolayer of iridium. In some embodiments, the present disclosure provides a fuel cell catalyst comprising a catalyst surface bearing a layer of iridium having a planar equivalent thickness of between 1 and 100 Angstroms. In some embodiments, the fuel cell catalyst comprises nanostructured elements comprising microstructured support whiskers bearing a thin film of nanoscopic catalyst particles. The layer of iridium typically has a planar equivalent thickness of between 1 and 100 Angstroms and more typically between 5 and 60 Angstroms. The fuel cell catalyst typically comprises no electrically conductive carbon material and typically comprises at least a portion of the iridium in the zero oxidation state.

The present disclosure provides a fuel cell membrane electrode assembly (MEA) comprising the fuel cell anode catalyst according to the present disclosure. The MEA according to the present disclosure may be used in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

In a fuel cell stack, multiple MEA's may be stacked as a series of cells to produce sufficiently high voltages for the desired application. In some embodiments, a fuel cell stack in the 80-100 kW range may comprise 300 to 400 MEA's. Since they are electrically connected in series, the total stack current flows through all the MEA's simultaneously. In nominal operation of the stack under hydrogen/air, the anode potential is ideally near zero volts relative to a reversible hydrogen electrode (RHE), or at most a few tenths of a volt positive during high current density operation. The cathode voltage is ideally at positive voltages between 0.6 and 1 volt relative to RHE potentials. However, due to various real-life operating scenarios, e.g., during start-up or shut-down of the fuel cell stack or during water blockage of the flow fields supplying the reactants, the electrodes of one or more MEA's can be deprived of the required concentration of reactant over either their whole active area or some fraction of it. When this happens on the anode, the affected MEA will be forced to oxidize something else in addition to any available hydrogen in order to pass through the current demanded by the MEA's of the cells on either side of it.

In the case of a fuel starvation event, the anode potential quickly rises until potentials are reached where carbon, platinum and water are oxidized sufficiently to support the current demand. Carbon oxidation results in degradation of carbon-supported catalyst layers and the gas diffusion layers, leading to increased resistance and mass transport losses. Platinum oxidation may result in formation of soluble platinum oxide species, resulting in loss of electrode surface area. Any of these effects may be irreversible, and may over time cause accumulated degradation of the fuel cell performance.

In the event of anode starvation, it is preferable that the electrode's water oxidation (oxygen evolution reaction, OER) kinetics be sufficiently fast at relatively low potentials as close as possible to the thermodynamic potential for the oxidation of water, to minimize any carbon (GDL) or platinum oxidation. For conventional PEM fuel cell anodes based on Pt particles dispersed on carbon black supports (Pt/C), it has been reported that iridium oxide particles added to the dispersed Pt/C may lower the potential for the oxygen evolution reaction, however, the use of iridium oxide particles does not adequately prevent the oxidation and degradation of fuel cell anodes comprising conventional Pt/C catalysts.

In some embodiments of the present disclosure, it is found that adding a sub-monolayer equivalent of Ir atoms sputter deposited onto the surface of the catalyst is effective to substantially reduce the potential for OER and permanent degradation of the performance of the MEA can be much reduced or eliminated, typically in combination with the elimination of Pt/C catalyst and replacement with a nanostructured thin film (NSTF) supported catalyst. Furthermore, a substantially smaller amount of Ir is required to achieve this effect, relative to the use of iridium oxide with Pt/C catalysts.

In some embodiments, the amount of Ir added is less than a monolayer of Ir atoms across the surface area of the catalyst. In some embodiments, the layer of Ir added does not occlude the surface of the catalyst. Typically the added layer of Ir leaves at least 30% of the catalyst surface non-occluded; more typically 50%, and more typically 70%. In some embodiments, the amount added corresponds to an effective average thickness on the catalyst surface of between 0.1 and 10 Angstroms, more typically between 0.5 and 6 Angstroms, and more typically between 1 and 3 Angstroms. In embodiments comprising highly structured NSTF catalyst, a planar equivalent thickness of 10 Angstroms may correspond to an effective average thickness on the catalyst surface of only 1 Angstrom, since the ratio of the catalyst surface area to planar equivalent area is approximately 10:1. In embodiments comprising NSTF catalyst, the amount of iridium added is a planar equivalent thickness of between 1-100 Angstroms, more typically between 5 and 60 Angstroms, more typically between 5 and 30 Angstroms, and more typically between 10 and 30 Angstroms. In some embodiments, iridium oxides are avoided and at least a portion of the iridium is in the zero oxidation state. In some embodiments, Ir is excluded from the bulk of the catalyst and occurs only in a surface layer.

The PEM comprising the MEA according to the present disclosure may comprise any suitable polymer electrolyte. The polymer electrolytes useful in the present disclosure typically bear anionic functional groups bound to a common backbone, which are typically sulfonic acid groups but may also include carboxylic acid groups, imide groups, amide groups, or other acidic functional groups. The polymer electrolytes useful in the present disclosure are typically highly fluorinated and most typically perfluorinated. The polymer electrolytes useful in the present disclosure are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2CF_2CF_2CF_2CF_2$—O—CF=$CF_2$, described in U.S. Pat. No. 6,624,328, and U.S. Pat. No. 7,348,088, which are incorporated herein by reference. The polymer typically has an equivalent weight (EW) of 1200 or less, more typically 1100 or less, more typically 1000 or less, and may have an equivalent weight of 900 or less, or 800 or less.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, in some embodiments less than 25 microns, and in some embodiments about 15 microns.

In one embodiment of the present disclosure, one or more manganese oxides, such as $MnO_2$ or $Mn_2O_3$, is added to the polymer electrolyte prior to membrane formation. Typically the oxide is mixed well with the polymer electrolyte to achieve substantially uniform distribution. Mixing is achieved by any suitable method, including milling, kneading and the like, and may occur with or without the inclusion of a solvent. The amount of oxide added is typically between 0.01 and 5 weight percent based on the total weight of the final polymer electrolyte or PEM, more typically between 0.1 and 2 wt %, and more typically between 0.2 and 0.3 wt %. Factors mitigating against inclusion of excessive manganese oxide include reduction of proton conductivity, which may become a significant factor at greater than 0.25 wt % oxide.

In one embodiment of the present disclosure, a salt of manganese is added to the acid form polymer electrolyte prior to membrane formation. Typically the salt is mixed well with or dissolved within the polymer electrolyte to achieve substantially uniform distribution. The salt may comprise any suitable anion, including chloride, bromide, nitrate, carbonate and the like. Once cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Manganese cations may be in any suitable oxidation state, including $Mn^{2+}$, $Mn^{3+}$ and $Mn^{4+}$, but are most typically $Mn^{2+}$. Without wishing to be bound by theory, it is believed that the manganese cations persist in the polymer electrolyte because they are exchanged with $H^+$ ions from the anion groups of the polymer electrolyte and become associated with those anion groups. Furthermore, it is believed that polyvalent manganese cations may form crosslinks between anion groups of the polymer electrolyte, further adding to the stability of the polymer. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05.

To make an MEA or CCM, cathode and anode catalyst layer may be applied to the PEM by any suitable means. In some embodiments, the present disclosure provides a CCM or MEA comprising certain catalysts comprising nanostructured elements comprising microstructured support whiskers bearing discrete or fused nanoscopic catalyst particles, i.e., a nanostructured thin film catalyst (NSTF). U.S. Pat. Nos. 4,812,352, 5,039,561, 5,176,786, and 5,336,558, the disclosures of which are incorporated herein by reference, concern microstructures which may be used in the practice of the present disclosure. U.S. Pat. Nos. 5,338,430, 5,879,827, 6,040,077 and 6,319,293 and U.S. Pat. No. 6,482,763, the disclosures of which are incorporated herein by reference, describe nanostructured elements comprising microstructured support whiskers bearing nanoscopic catalyst particles. U.S. Pat. No. 5,879,827 and U.S. Pat. No. 6,482,763, the disclosures of which are incorporated herein by reference, describe nanoscopic catalyst particles comprising alternating layers.

In some embodiments, the nanoscopic catalyst particles may be made by the alternating application of multiple layers of catalyst material. In some embodiments, nanoscopic catalyst particles according to the present disclosure may be made by the alternating application of first and second layers, the first layer comprising or consisting essentially of platinum and the second layer being an alloy or intimate mixture of manganese and a second transition metal selected from the group consisting of Group VIb metals, Group VIIb metals and Group VIIb metals other than platinum and manganese. Alternately, three layers may be applied, the first layer comprising or consisting essentially of platinum, the second layer comprising or consisting essentially of manganese, and the third comprising or consisting essentially of a second transition metal selected from the group consisting of Group VIb metals, Group VIIb metals and Group VIIb metals other than platinum and manganese. Typically the second transition metal is selected from the group consisting of nickel and cobalt. It is contemplated that alternating application of first and second layers does not exclude the application of layers in addition to the first and second layers. Typically, the volume ratio of manganese to the other transition metal is between 10:90 and 90:10. In some embodiments, the volume ratio of manganese to the other transition metal is between 40:60 and 60:40. The average bilayer planar equivalent thickness of the first and second layers is typically less than 100 Å. The average bilayer planar equivalent thickness is typically greater than 3 Å and more typically greater than 8 Å.

NSTF catalyst may be made by any suitable method. Typically, the NSTF catalyst is made by alternate steps of vacuum deposition of a layer comprising or consisting essentially of platinum and a second layer, or a second and a third layer, on a film of microstructures. Typically, sputter deposition is used.

Any suitable microstructures may be used, including organic or inorganic microstructures. Typical microstructures are described in U.S. Pat. Nos. 4,812,352, 5,039,561, 5,176,786, 5,336,558, 5,338,430, 5,879,827, 6,040,077 and 6,319,293, and U.S. Pat. No. 6,482,763, the disclosures of which are incorporated herein by reference. Typical microstructures are made by thermal sublimation and vacuum annealing of the organic pigment C.I. Pigment Red 149, i.e., N,N'-di(3,5-xylyl)perylene-3,4:9,10-bis(dicarboximide). Methods for making organic nanostructured layers are disclosed in Materials Science and Engineering, A158 (1992), pp. 1-6; J. Vac. Sci. Technol. A, 5 (4), July/August, 1987, pp. 1914-16; J. Vac. Sci. Technol. A, 6, (3), May/August, 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. Nos. 4,568,598, 4,340,276, the disclosures of the patents are incorporated herein by reference. Properties of catalyst layers using carbon nanotube arrays are disclosed in the article "High Dispersion and Electrocatalytic Properties of Platinum on Well-Aligned Carbon Nanotube Arrays," Carbon 42 (2004) 191-197. Properties of catalyst layers using grassy or bristled silicon are disclosed in U.S. Pat. No. 6,946,362.

Typically, the microstructure material excludes electrically conductive materials and more typically excludes electrically conductive carbon. Most typically, the microstructure material excludes carbon black.

In an alternate embodiment, a multicomponent NSTF catalyst may be deposited from fewer targets than the total number of components, where at least one target is composed of at least two components. In an alternate embodiment, a multicomponent NSTF catalyst such as a ternary catalyst may be deposited from a single target, as disclosed in U.S. Patent Publication No. 2007/0082814 A1, the disclosure of which is incorporated herein by reference.

Vacuum deposition may be carried out in any suitable apparatus, such as described in U.S. Pat. Nos. 5,338,430, 5,879,827, 5,879,828, 6,040,077 and 6,319,293 and U.S. Patent Application Publication No. 2002/0004453 A1, the disclosures of which are incorporated herein by reference. One such apparatus is depicted schematically in FIG. 4A of U.S. Pat. Nos. 5,879,827 and 6,040,077, and discussed in the accompanying text, wherein the substrate is mounted on a drum which is then rotated under multiple DC magnetron sputtering sources in sequence. The resulting structure may be layered, or substantially layered, or may include more complex intermixed structures, depending on the thickness of the material deposited and the surface area of the substrate on which the material is deposited.

The catalysts of the present disclosure can be used to manufacture membrane electrode assemblies (MEA's) incorporated in fuel cells such as are described in U.S. Pat. Nos. 5,879,827 and 5,879,828, the teachings of which are incorporated herein by reference.

Iridium may be added to the catalyst according to the present disclosure by any suitable method. Typically, iridium is added by a vacuum deposition method such as described above for the manufacture of NSTF catalyst, especially where the catalyst is an NSTF catalyst. Iridium is typically added in the absence of oxygen. As a result, at least a portion of the iridium should be applied in the zero oxidation state. In some embodiments, addition of iridium forms a final step in a process of manufacturing an NSTF catalyst. In some embodiments, the application of iridium is carried out in the same apparatus as the application of other catalyst materials and immediately subsequent to the application of other catalyst materials. In some embodiments, the formation of NSTF catalyst is carried out in an apparatus equipped with a Pt target, and an Ir target. In some embodiments, the formation of NSTF catalyst is carried out in an apparatus equipped with an Ir target and one or more catalyst targets. In some embodiments, the formation of NSTF catalyst is carried out in an apparatus equipped with a Pt target, an Ir target, and a third target. In some embodiments, the formation of NSTF catalyst is carried out in an apparatus equipped with a Pt target, an Ir target, and a third target comprising one or more of Mn, Co or Ni. In some embodiments, the formation of NSTF catalyst is carried out in an apparatus equipped with a single target comprising Ir and one or more catalyst materials.

In making an MEA, GDL's may be applied to either side of a CCM. The GDL's may be applied by any suitable means. Any suitable GDL may be used in the practice of the present disclosure. Typically the GDL is comprised of sheet material comprising carbon fibers. Typically the GDL is a carbon fiber construction selected from woven and non-woven carbon fiber constructions. Carbon fiber constructions which may be useful in the practice of the present disclosure may include: Toray™ Carbon Paper, SpectraCarb™ Carbon Paper, AFN™ non-woven carbon cloth, Zoltek™ Carbon Cloth, Mitsubishi Rayon Corp. carbon papers, and the like. The GDL may be coated or impregnated with various materials, including carbon particle coatings, hydrophilizing treatments, and hydrophobizing treatments such as coating with polytetrafluoroethylene (PTFE).

In use, the MEA according to the present disclosure is typically sandwiched between two rigid plates, known as reactant distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This disclosure is useful in the manufacture and operation of fuel cells.

Objects and advantages of this disclosure are further illustrated by the following examples, but the particular materials and amounts thereof recited in these examples, as well as other conditions and details, should not be construed to unduly limit this disclosure.

EXAMPLES

In the following Examples, MEA's having different anode catalysts were fabricated and tested under a set of standard fuel cell test conditions, both before and after a specific test of their fuel starvation tolerance. All the MEA's used the same membranes and gas diffusion layers, and were tested on two nominally identical test stations and cell hardware. Several types of anode catalysts were compared, including conventional dispersed Pt/Carbon at two loadings (comparative), NSTF-PtCoMn ternary alloy without a surface Ir sub-monolayer (comparative) and NSTF-PtCoMn ternary alloy with a surface Ir sub-monolayer (catalysts which are the subject of this disclosure). The different anode catalysts were characterized for their OER (oxygen evolution reaction rates), ORR (oxygen reduction activity), HOR (hydrogen oxidation activity), and performance and surface area stability under an accelerated durability test.

Manufacture of NSTF Catalyst MEA's

In the following examples, nanostructured thin film, thin layer catalyst (NSTF) based MEA's, were made and assembled as described in detail in U.S. patent application Ser. No. 10/674,594, issuing Sep. 2, 2008, as U.S. Pat. No. 7,419,741, and U.S. patent application Ser. No. 11/248,561, the disclosures of which is incorporated herein by reference. The multi-element NSTF ternary catalyst were made by alternating layers of Pt and CoMn with variable thickness of the Pt and transition metal bi-layers, as described in the above references. The NSTF anode and cathode catalysts were each applied by lamination transfer to one side of a 1.3 mil thick cast PEM (available from 3M Company) with equivalent weight of about 850 to form a half-catalyst coated membrane (½-CCM) and the CCM was formed by putting two ½-CCMs together with the catalyst sides out.

The diffusion-current collectors (DCC) placed on either side of the CCM to form the MEA were fabricated by coating a gas diffusion micro-layer on one side of a carbon paper electrode backing layer (available from Mitsubishi Rayon Corp.) that had been treated with Teflon to improve hydrophobicity. The same basic DCC and PEM were used for all samples.

For MEA's according to the present disclosure, a layer of Ir was sputter deposited over the deposited NSTF PtCoMn alloy from an Ir target prior to lamination to make a ½-CCM. In the following Examples, five different planar equivalent thicknesses of sputter-deposited Ir were evaluated: 5 Angstroms, 10 Angstroms, 15 Angstroms, 30 Angstroms and 60 Angstroms. Since the geometric surface area of the NSTF PtCoMn coated whiskers is approximately 10, the effective surface atomic thicknesses of the applied Ir in these five cases are roughly 0.5, 1, 1.5, 3 and 6 Angstroms respectively. Without being bound by theory, it might be expected that the applied Ir would preferentially localize at step edges of the PtCoMn crystalline facets, forming stable nano-islands, with high activity for water oxidation while protecting the Pt from dissolution during high voltage excursions.

MEA Evaluation

The MEA's were installed in 50 $cm^2$ cells, having quad-serpentine flow fields, at about 10% compression, and operated under a scripted protocol until the performance stabilized. Testing continued under multiple sets of operating conditions, including potentiodynamic scanning (PDS) and galvanodynamic scanning (GDS) at ambient pressure with constant flow conditions. In particular, the PDS polarization curves were used to measure the specific activity for each catalyst composition according to the method described in Debe et al., "Activities of Low Pt Loading, Carbon-less, Ultra-Thin Nanostructured Film-Based Electrodes for PEM Fuel Cells and Roll-Good Fabricated MEA Performances in Single Cells and Stacks," 2003 Fuel Cell Seminar Abstract Book, pp. 812-815 ("2003 FC Abstract," incorporated herein by reference) at p. 812 bottom et seq., including FIG. 4 therein (referred to therein as "second method"). In that reference, it was shown that the fundamental area specific activity of the NSTF catalysts was about 5 times higher than Pt/C dispersed catalysts.

Example 1

Anode Stability Test

Four comparative electrodes were tested, two NSTF (MEA type 1 in Table I) and two Pt/carbon (MEA type 3 and 4 in Table I), and two electrodes according to the present disclosure were tested (MEA type 2 in Table I).

TABLE I

MEA's evaluated under anode stability test

| MEA Type | Number of MEA's | Anode | Cathode |
|---|---|---|---|
| 1 | 2 | 0.1 mg/$cm^2$ Pt in NSTF-PtCoMn | 0.15 mg/$cm^2$ Pt in PtCoMn/NSTF |
| 2 | 2 | 0.1 mg/$cm^2$ Pt in NSTF-PtCoMn w/15 Angstroms of Ir | 0.15 mg/$cm^2$ Pt in PtCoMn/NSTF |
| 3 | 1 | 0.2 mg/$cm^2$ Pt/Carbon | 0.2 mg/$cm^2$ Pt/Carbon |
| 4 | 1 | 0.4 mg/$cm^2$ Pt/Carbon | 0.4 mg/$cm^2$ Pt/Carbon |

Durability Test Procedure

In the durability test procedure, initial baseline fuel cell performance was first evaluated as described above. The specific test for oxygen evolution reaction (OER) was to "corrode" the anode by forcing 2 mA/cm² through the cells with $N_2$ on the anode, for 5 hours. The cells were operated in a galvanostatic mode and the cell potential was monitored over time. The cell performance was then measured again after the OER testing. This was followed by thermal cycling to recover as much performance as possible, and then cell performance was measured a third time. Cell performance was measured under the following conditions: 80/80/80° C., 0/0 psig outlet, 696/1657SCCM $H_2$/Air GDS(0 A/cm²→0.40V→0 A/cm², 0.05 A/cm²/step, 20s/step.

FIG. 1 shows the time traces of the cell anode potentials versus the 1% $H_2$ potential of the cathode, under the forced current of 2 mA/cm². As can be seen, the NSTF traces are very different from the dispersed Pt/C trace, which shows evidence for carbon oxidation of the catalyst support followed by a period of very high cell potentials exceeding 1.8 volts. The two baseline NSTF PtCoMn MEA's without surface iridium show a different type of trace, in which the cell potential increases more uniformly to about 1.6 volts before gradually decreasing to about 1.5 volts. Both such MEA's had almost identical traces (labeled "0.10 mg/cm2 PtCoMn"). Two MEA's with surface iridium on the anode are shown in FIG. 1, (labeled "modified NSTF") and clearly show that they held the cell potential at close to 1.4 volts initially and then gradually increased to 1.5 volts. These traces show that the NSTF PtCoMn is superior to the dispersed Pt/C for being able to limit the anode potential during cell reversal conditions, but that addition of the 15 Angstroms of Ir to the surface is even much better yet in limiting the potential to lower, less corrosive potentials.

In FIG. 1, the voltage time traces for the Pt/C electrodes suggest two phases of carbon support may be oxidizing. Potential reaches 1.8 V. The NSTF-PtCoMn baseline potential is held to <1.6 V, better than standard Pt/C. The NSTF-PtCoMn+15 Ang. Ir catalyst shows a significant reduction in OER potential to ~1.4 V.

Figure 2:
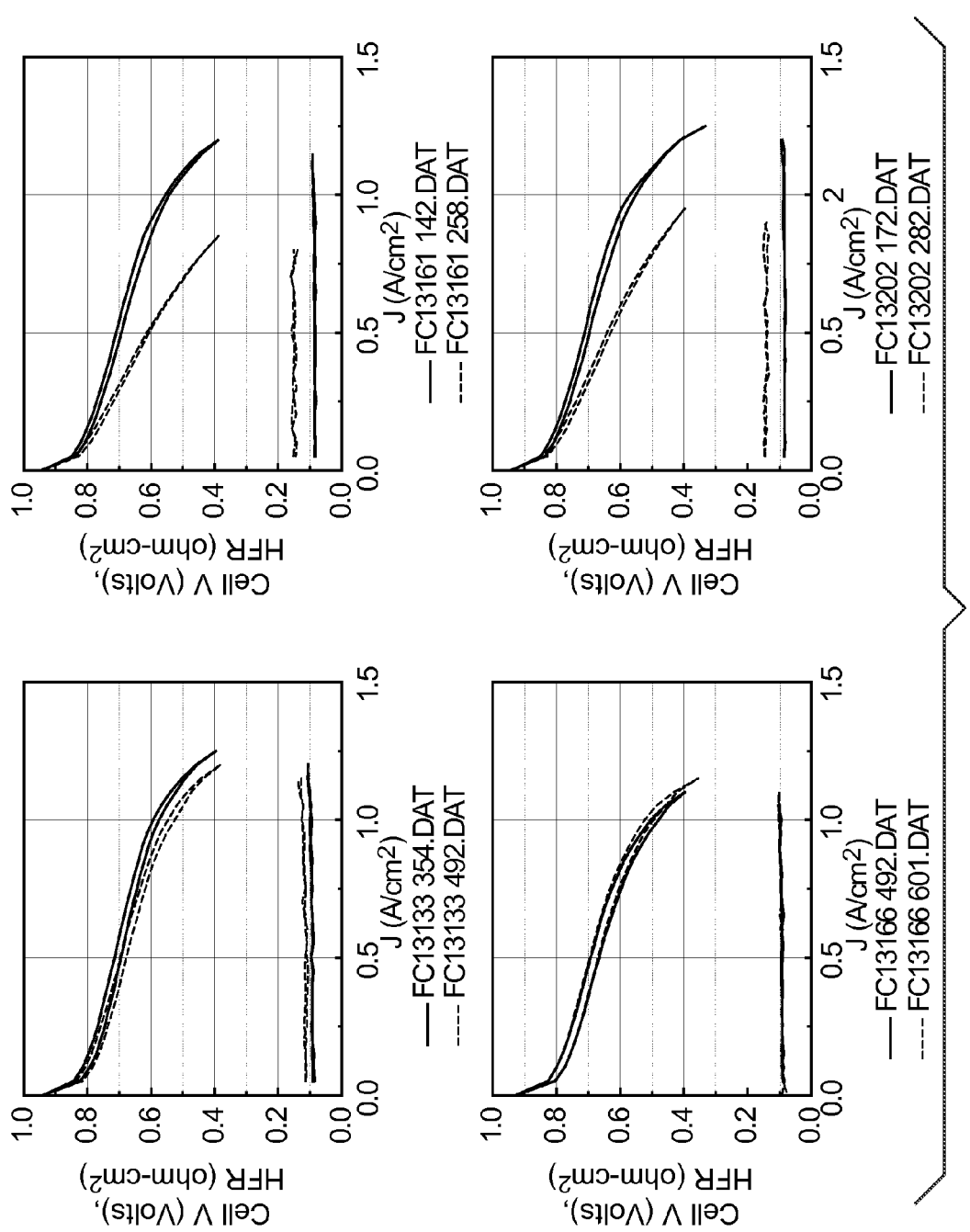
FIG. 2 is a graph representing polarization curves and high frequency impedance for comparative and subject MEA's before and after an anode fuel starvation test, as described in Example I.

All MEA's lost considerable performance after the cell reversal testing, but by thermal cycling the MEA's (that is stopping and cooling down the cells, then restarting them followed by several repeats) recovered most of the loss, shown in FIG. 2. FIG. 2 shows that the NSTF-PtCoMn sustained less performance loss than the Pt/C anodes, and the NSTF-PtCoMn+15 Angstroms Ir sustained even less loss from the accelerated test.

In FIG. 2, the 0.4 Pt/C anode MEA appeared to suffer slightly less irreversible degradation than the 0.2 Pt/C anode MEA. The extent of HFR change appears similar. The irreversible loss of the two NSTF PtCoMn MEA's is much less than the Pt/C's. The NSTF catalyst with the surface Ir (labeled "0.10PtCoMn(mod.)/NSTF") shows even less irreversible loss in performance or HFR increase in either MEA tested.

Figure 3:
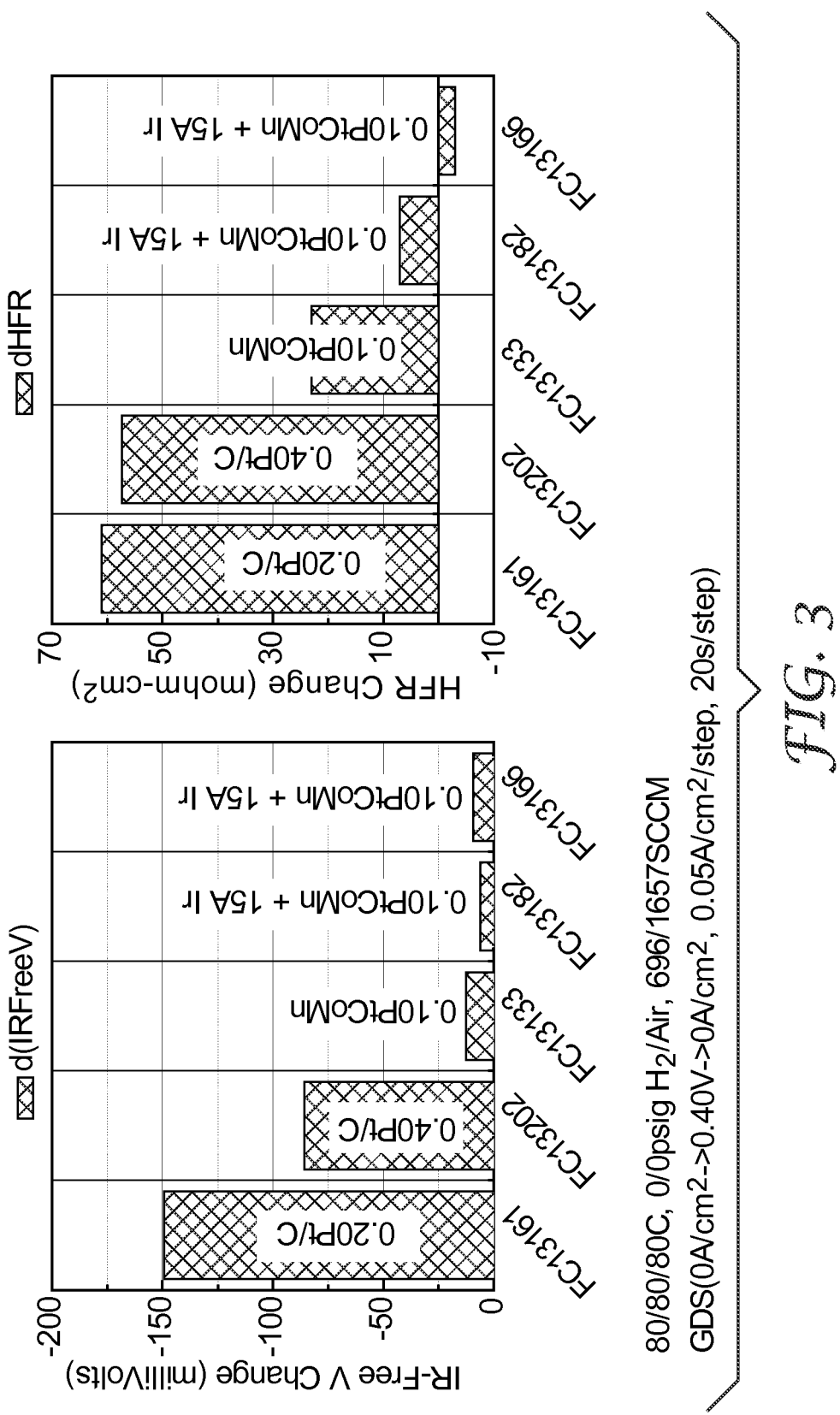
FIG. 3 is a graph representing changes in high frequency resistance (HFR) and impedance loss-corrected voltage for comparative and subject MEA's before and after a anode fuel starvation test, as described in Example I.

FIG. 3 summarizes the change in high frequency resistance (HFR) and impedance loss-corrected voltage occurring after the durability test, for the MEA's in FIG. 2. The HFR change is believed to be due to damage to the gas diffusion layer (GDL) contacting the electrodes.

FIG. 3 shows that the 0.2 and 0.4 Pt/C MEA's lost 80 and 150 mV of impedance-corrected voltage compared to <20 mV with the NSTF-PtCoMn samples. The presence of the Ir reduced this voltage loss further, and was also beneficial in reducing the HFR change for the NSTF MEA's.

Example 2

OER Polarization Curves Vs. Ir Level

In this example, the OER polarization curves for NSTF PtCoMn anodes with four different levels of surface Ir are compared: no Ir (FC13259, comparative), 10 Angstroms planar equivalent (FC13436), 15 Angstroms planar equivalent (FC13366) and 30 Angstroms planar equivalent (FC13404). Table II summarizes the sample MEA's NSTF anode and NSTF cathode composition.

TABLE II

Samples for Example 2.

| Sample | Anode Electrode | Cathode Electrode |
|---|---|---|
| FC13259 | PtCoMn (0.1 mg/cm2) | Pt (0.2 mg/cm2) |
| FC13366 | PtCoMn (0.1 mg/cm2) + 15A Ir | PtCoMn (0.1 mg/cm2) |
| FC13404 | PtCoMn (0.1 mg/cm2) + 30A Ir | PtCoMn (0.1 mg/cm2) |
| FC13436 | PtCoMn (0.1 mg/cm2) + 10A Ir | PtCoMn (0.1 mg/cm2) |
| FC13639 | PtCoMn (0.1 mg/cm2) + 5A Ir | PtCoMn (0.1 mg/cm2) |
| FC13793 | PtCoMn (0.1 mg/cm2) + 60A Ir | PtCoMn (0.1 mg/cm2) |
| FC13530 | PtCoMn (0.1 mg/cm2) | PtCoMn (0.1 mg/cm2) |
| FC13336 | PtCoMn (0.1 mg/cm2) + 15A Ir | PtCoMn (0.1 mg/cm2) |

Figure 4:
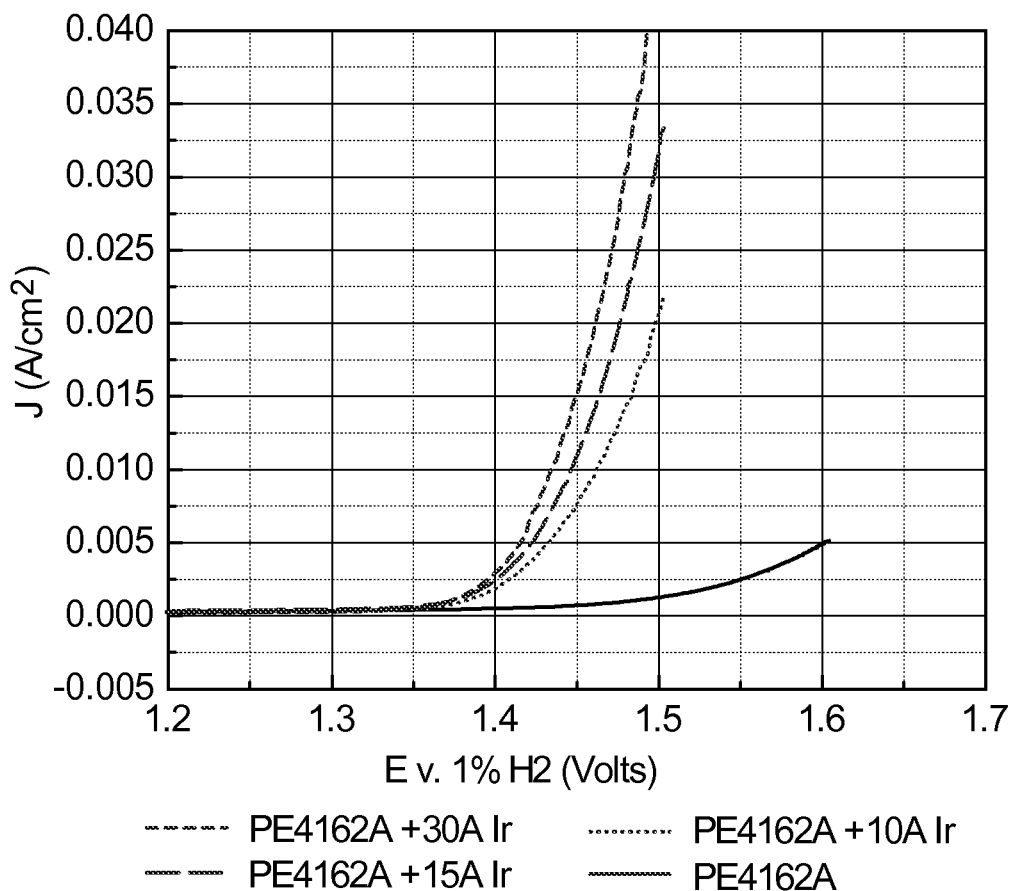
FIG. 4 is a graph representing oxygen evolution polarization curves for comparative and subject NSTF catalysts, as described in Example II.

FIG. 4 shows the recorded OER polarization curves from the MEA's listed in Table II. Measurements of the OER polarization curves were made with $N_2$ on the working electrode and 1% $H_2$ on the reference/counter electrode. A potentiostat was used to vary the potential the current response was measured. Higher current density at a given voltage indicates a more active catalyst for OER kinetics. At 1.5V, the addition of 10 Å of Ir to the surface of the NSTF PtCoMn alloy increased the OER current from 1.3 to 21 mA/cm²; additional Ir to 15 and 30 Angstroms increased the current density to over 30 and 40 mA/cm² respectively. This implies the OER kinetics are increased 30× by the addition of the 30 Angstroms of Ir to the surface of the PtCoMn.

Figure 5:
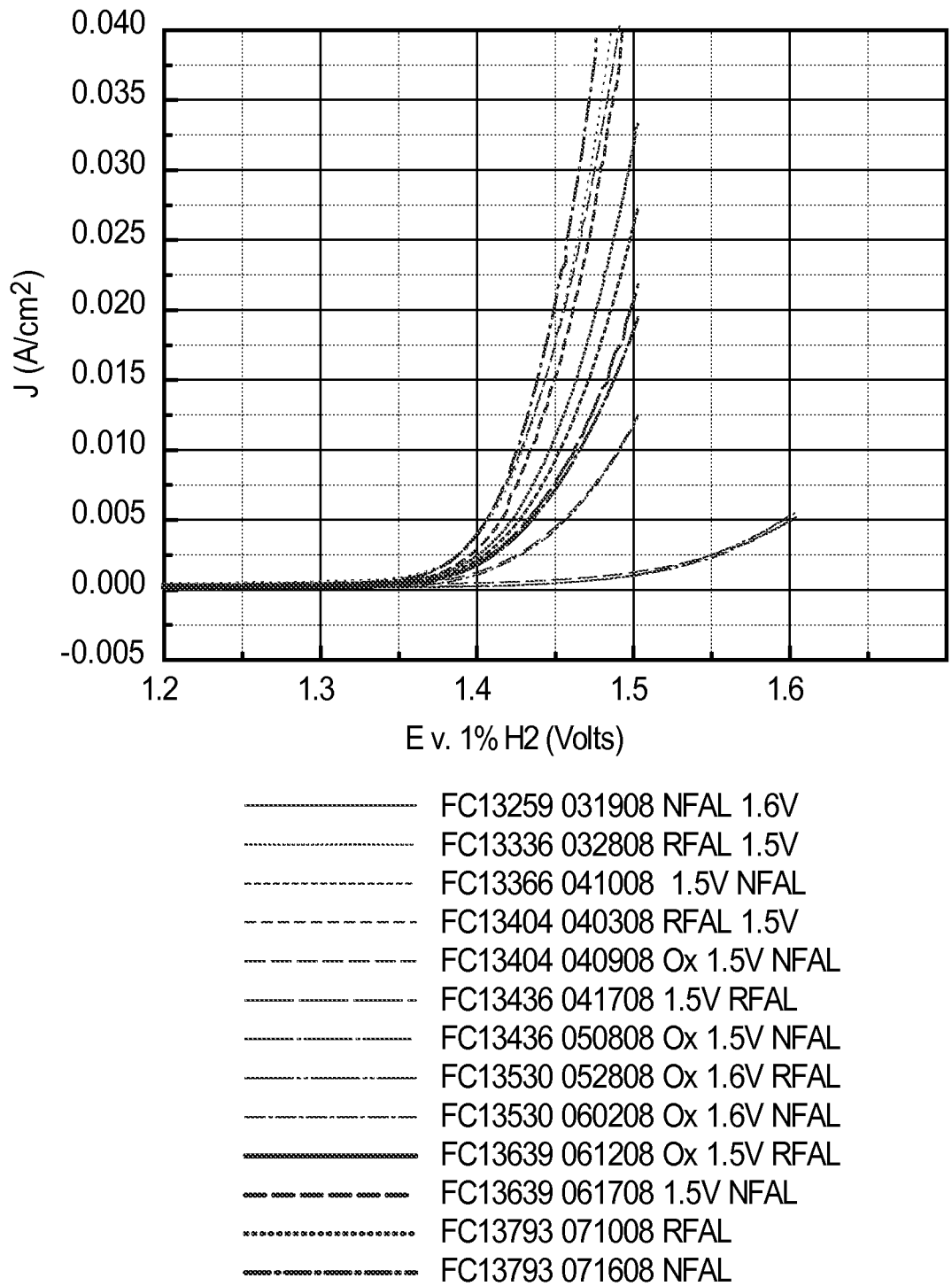
FIG. 5 is a graph representing oxygen evolution polarization curves for comparative and subject NSTF catalysts, as described in Example II.

FIG. 5 shows the recorded OER polarization curves from the MEA's listed in Table II and additional MEA's with 5 and 60 Angstrom surface layers of Ir added.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A fuel cell catalyst comprising nanostructured elements comprising microstructured support whiskers having a catalyst surface comprising platinum and iridium, said catalyst surface bearing a surface sub-monolayer of the iridium.

2. The fuel cell catalyst according to claim 1, wherein the surface sub-monolayer of iridium has a planar equivalent thickness of between 1 and 100 Angstroms.

3. The fuel cell catalyst according to claim 1, wherein the surface sub-monolayer of iridium has a planar equivalent thickness of between 5 and 60 Angstroms.

4. The fuel cell catalyst according to claim 1, wherein the iridium comprises iridium in the zero oxidation state.

5. The fuel cell catalyst according to claim 1, wherein the fuel cell catalyst comprising no electrically conductive carbon material.

6. A fuel cell membrane electrode assembly comprising an anode catalyst which is a fuel cell catalyst according to claim 1.

7. A fuel cell catalyst comprising nanostructured elements comprising microstructured support whiskers having a catalyst surface comprising platinum and iridium, said catalyst surface bearing a non-occluding surface layer of iridium.

8. The fuel cell catalyst according to claim 7, wherein the iridium comprises iridium in the zero oxidation state.

9. A fuel cell membrane electrode assembly comprising an anode catalyst which is a fuel cell catalyst according to claim 7.

10. The fuel cell catalyst according to claim 7, wherein the fuel cell catalyst comprising no electrically conductive carbon material.

* * * * *

UNITED STATES PATENT AND TRADEMARK OFFICE
CERTIFICATE OF CORRECTION

| | | |
|---|---|---|
| PATENT NO. | : 8,637,193 B2 | Page 1 of 1 |
| APPLICATION NO. | : 12/546775 | |
| DATED | : January 28, 2014 | |
| INVENTOR(S) | : Andrew Steinbach | |

It is certified that error appears in the above-identified patent and that said Letters Patent is hereby corrected as shown below:

Title Page 2, References Cited Column 1 (Other Publications)
Line 4, delete "85" and insert -- 815 --, therefor.

Title Page 2, References Cited Column 2 (Other Publications)
Line 22, delete "amd" and insert -- and --, therefor.

Line 35, delete "Ohnume," and insert -- Ohnuma, --, therefor.

Line 39, delete "Publishes" and insert -- Publishers --, therefor.

In the Specification
Column 7
Line 17, delete "VIIb" and insert -- VIIIb --, therefor.

Line 23, delete "VIIb" and insert -- VIIIb --, therefor.

Signed and Sealed this
Twenty-third Day of September, 2014

Michelle K. Lee
*Deputy Director of the United States Patent and Trademark Office*